(No Model.)

J. GRANT.
WATER FILTER.

No. 344,958. Patented July 6, 1886.

WITNESSES.
Frank G. Parker
William Edson

INVENTOR.
Jott Grant

N. PETERS, Photo-Lithographer, Washington, D. C.

UNITED STATES PATENT OFFICE.

JOTT GRANT, OF BOSTON, MASSACHUSETTS.

WATER-FILTER.

SPECIFICATION forming part of Letters Patent No. 344,958, dated July 6, 1886.

Application filed October 8, 1885. Serial No. 179,369. (No model.)

*To all whom it may concern:*

Be it known that I, JOTT GRANT, of Boston, in the county of Suffolk and State of Massachusetts, have invented a new and useful Improvement in Water-Filters, of which the following, taken in connection with the accompanying drawings, is a specification.

My invention relates to that class of filters that are applicable to the ordinary domestic faucets, and has for its object to so construct such a filter that it can be readily applied to any variety of faucet now in use, and also retain the good qualities of the best filters now in use. These objects I attain by the mechanism shown in the accompanying drawings, in which—

Figure 1:
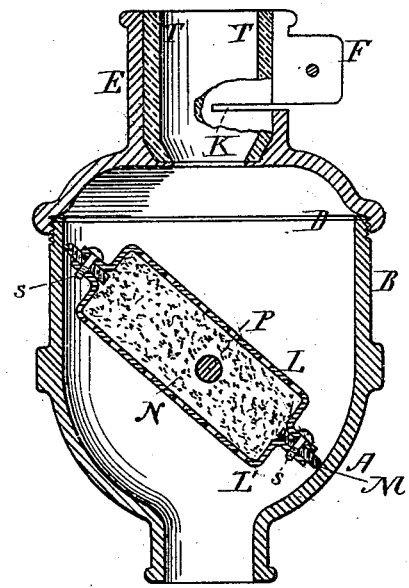
Figure 2:
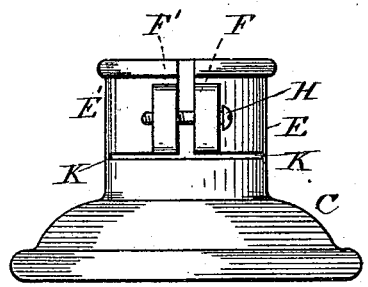
Figure 3:
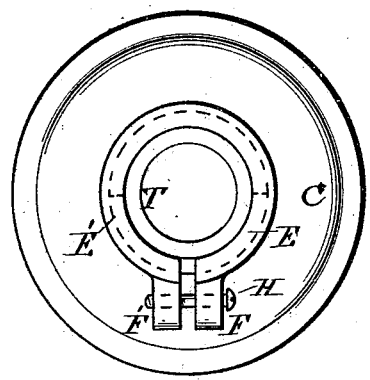
Figure 4:
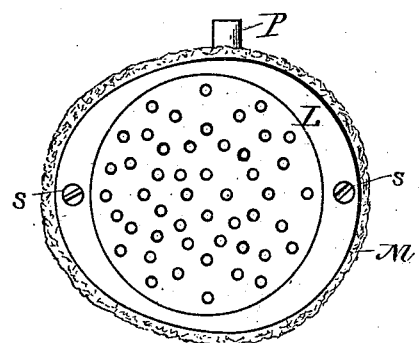

Figure 1 is a vertical section of my filter. Fig. 2 is an elevation of the cap. Fig. 3 is a plan of the cap, and Fig. 4 is a plan of the box that holds the filtering material.

In the drawings, A B, Fig. 1, represent the lower or body part of the filter-case, and in form has a part, A, hemispherical in shape, united to a part, B, cylindrical in shape.

The cap C, Figs. 1, 2, and 3, is made in the form shown, and is united by a screw-connection to the part B, as shown in Fig. 1.

D, Fig. 1, is a gasket or packing placed between the edges of the part C and B for the purpose of making a water-tight joint.

L and L′ represent two diaphragms, which together form a circular box, N, Figs. 1 and 4, and flanges s s, Figs. 1 and 4, which serve to inclose a circular gasket or packing-ring, M, which makes a water-tight fit with the inside of the case A B. The box N is filled with some material—charcoal, for instance—which acts as a filter.

P is an axle to which the box N is attached in such a manner that the box N may be reversed by turning said axle.

R, Fig. 4, is a handle attached to the axle P, by which said axle may be turned from right to left.

Attached to and made a component part of the cap C is a neck, E E′, which serves to connect the filter to the faucet. This neck E E′ has a kerf, K K, and two ears, F F′, which are united by a clamp-screw, H, Fig. 2. By this construction of the neck, its upper part becomes an expansible ring.

In the expansible ring E E′, above referred to, I place a rubber tube, T, Figs. 1 and 3, which act as a packing between the neck of the filter and the end of the faucet, and as the ring E E′ can be contracted by aid of the clamp-screw H, so as to bring a great pressure to bear upon the rubber T T, and thence upon the end of the faucet, it may be understood that the connection between the neck E E′ of the filter and the end of the faucet may be of a very firm nature.

By adding to a filter the adjustable neck E E′ I make it much more valuable, commercially, as a filter with my improved neck attached can be applied to a variety of sized faucets, thus doing away with especial fitting for each faucet. The interior of the neck E E′ is contracted near its lower end, as shown in Fig. 1, so as to form a conical support for the lower part of the rubber tube T T. This conical contraction terminates in an inwardly-projecting flange, as shown in Fig. 1.

The object of coning and contracting the lower part of the interior of the neck E E′ is to so construct the tube T that it will form an elastic stop for the end of the bib. In other words, the end of the bib may be forced hard into the coned part of the rubber tube and thus make a water-tight joint below the lateral kerf K, otherwise there would be a liability to leakage, although the kerfed clamping device might serve to firmly hold the filter to the bib.

I claim—

In a filter, the combination of the case B C with the neck E E′, said neck E E′ having an interior cylindrical opening terminating at its lower end in a coned contraction, whereby a water-tight fit is secured for the lower end of the bib, which is kerfed both longitudinally and laterally, and is provided with ears E E′ and clamping-screw H, all operating together, substantially as described, and for the purpose set forth.

JOTT GRANT.

Witnesses:
FRANK G. PARKER,
WILLIAM EDSON.